(12) United States Patent
Takahashi

(10) Patent No.: US 7,116,564 B2
(45) Date of Patent: Oct. 3, 2006

(54) SWITCHING POWER SUPPLY UNIT AND SEMICONDUCTOR DEVICE FOR SWITCHING POWER SUPPLY

(75) Inventor: Satoru Takahashi, Otsu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/180,702

(22) Filed: Jul. 14, 2005

(65) Prior Publication Data

US 2006/0018136 A1 Jan. 26, 2006

(30) Foreign Application Priority Data

Jul. 20, 2004 (JP) ............................. 2004-211779

(51) Int. Cl.
*H02M 3/335* (2006.01)
*H02M 3/315* (2006.01)

(52) U.S. Cl. .............................. 363/21.16; 363/21.17; 363/21.12

(58) Field of Classification Search ............. 363/21.12, 363/21.15, 21.16, 21.17, 21.18
See application file for complete search history.

(56) References Cited

U.S. PATENT DOCUMENTS 6,674,656 B1 * 1/2004 Yang et al. ................. 363/21.1
6,879,501 B1 * 4/2005 Mori ........................ 363/56.03
6,958,920 B1 * 10/2005 Mednik et al. ................ 363/19
6,980,444 B1 * 12/2005 Takahashi ................. 363/21.18
7,035,119 B1 * 4/2006 Koike .......................... 363/19

FOREIGN PATENT DOCUMENTS

JP 06038518 2/1994

* cited by examiner

*Primary Examiner*—Bao Q. Vu
(74) *Attorney, Agent, or Firm*—Stevens, Davis, Miller & Mosher, LLP

(57) ABSTRACT

Overload protecting operation is performed by controlling the current peak value of a switching device 1 through the use of a comparator 8, a NAND circuit 5, and so on according to variations in feedback current being input to a feedback signal control circuit 11, internally setting the overcurrent protection of switching device 1 through the use of a clamp circuit 12, charging a capacitor 34 when having fallen below a specified current smaller than current required for the overcurrent protection for a fixed time period, and detecting rise in voltage VOL at the capacitor 34 to a constant voltage to stop switching operation.

By achieving the overload protection under normal load and the overcurrent protection against peak load in a single switching power supply unit, problems such as the complexity of the unit and an increase in the element count of the control circuit are solved.

21 Claims, 10 Drawing Sheets

SWITCHING POWER SUPPLY UNIT AND SEMICONDUCTOR DEVICE FOR SWITCHING POWER SUPPLY

BACKGROUND OF THE INVENTION

1. Field of the Invention

The present invention relates to a switching power supply unit having an overload protecting function and an overcurrent protecting function and to a semiconductor device used for the switching power supply unit.

2. Background Art

FIG. 8 is a circuit diagram of an example of conventional switching power supply units. In FIG. 8, reference numeral 130 denotes a semiconductor device for controlling the switching power supply. The semiconductor device 130 includes a switching device 101 and its control circuit.

The semiconductor device 130 is provided with the input terminal (DRAIN) of the switching device 101, an auxiliary power supply voltage input terminal (VCC), an internal circuit power supply terminal (VDD), a feedback signal input terminal (FB), the output terminal of the switching device 101, and the GND terminal (GND) of the control circuit as external input terminals.

Reference numeral 102 is a regulator which supplies the internal circuit power supply of the semiconductor device 130. The regulator is provided with a switch 102A, which flows a starting current into VCC, and a switch 102B which supplies the current from VCC to VDD.

Reference numeral 103 denotes a start-up constant current source which supplies a start-up circuit current. The constant current source supplies the starting current to VCC via the switch 102A during start up.

Reference numeral 107 denotes a start-up and shut-down circuit which controls the start up and the shut down of the semiconductor device 130. The start-up and shut-down circuit detects voltage at VCC and outputs a signal which stops the switching operation of the switching device 101 to a NAND circuit 105 when voltage at VDD is below a constant voltage.

Reference numeral 106 denotes a drain current detection circuit which detects a current flowing into the switching device 101 through the detection of the on voltage at the switching device 101 generated by the product of the current flowing into the switching device 101 and the on resistance of the switching device 101 and which converts the detected current value of the switching device 101 to a voltage signal to output the voltage signal to a comparator 108 according to the current value of the switching device 101.

Reference numeral 111 denotes a feedback signal control circuit which converts a current signal inputted to the FB terminal to a voltage signal to output the signal to the comparator 108. The comparator 108 outputs a signal to the reset terminal of a RS flip-flop circuit 110 when the output signal from the feedback signal control circuit 111 becomes equal to the output signal from the drain current detection circuit 106.

Reference numeral 112 denotes a clamp circuit which determines the maximum value of the output signal of the feedback signal control circuit 111. Since the clamp circuit 112 determines the maximum value of the current flowing into the switching device 101, the clamp circuit 112 has the function of protecting the switching device 101 from overcurrent and limits the maximum value of the primary drain current, which limits a maximum power to be supplied to a secondary load and determines an overload protection level.

Reference numeral 109 denotes an oscillation circuit, which outputs a maximum duty-cycle signal 109A, which determines the maximum duty cycle of the switching device, 101, and a clock signal 109B which determines the oscillation frequency of the switching device 101. The maximum duty-cycle signal 109A is input to the NAND circuit 105, and the clock signal 109B is input to the set terminal of the RS flip-flop circuit 110.

The output signal of the start-up and shut-down circuit 107, the maximum duty-cycle signal 109A, and an output signal of the RS flip-flop circuit 110 are input to the NAND circuit 105. The output signal of the NAND circuit 105 is input to a gate drive circuit 104 to control the switching operation of the switching device 101.

Reference numeral 140 denotes a transformer, which has a primary winding 140A, a secondary winding 140B, and a primary auxiliary winding 140C.

A rectifying-smoothing circuit composed of a diode 131 and a capacitor 132 is connected to the primary auxiliary winding 140C and is used as the auxiliary power supply section of the semiconductor device 130 used for input to VCC.

Reference numeral 133 denotes a capacitor for stabilizing VDD.

Reference numeral 135 denotes a control signal transmission circuit which transmits a control signal from the secondary side to the primary side and which is composed of a phototransistor 135A and a photodiode 135B. The collector of the phototransistor 135A is connected to FB, and the emitter of the phototransistor 135A is connected to GND.

A rectifying-smoothing circuit composed of a diode 150 and a capacitor 151 is connected to the secondary winding 140B and is further connected to the photodiode 135B, a secondary control circuit 158, and a load 157.

The secondary control circuit 158 includes a shunt regulator 152, resistors 154, 155, and 156, and a capacitor 153, supplies a voltage divided by the resistors 154 and 155 for detecting secondary output voltage VO to the reference terminal of the shunt regulator 152, and controls a current which flows into the photodiode 135B connected to the cathode of the shunt regulator so as to keep the secondary output voltage VO constant.

The operation of the switching power supply unit having such a configuration will be described with reference to FIGS. 8 and 9. FIG. 9 is a time chart of the operation waveform of each section shown in FIG. 8.

In FIG. 8, a direct-current voltage VIN formed by rectifying and smoothing commercial alternating-current power supply voltage, for instance, is supplied to the input terminal. VIN is applied to the DRAIN terminal of the semiconductor device 130 via the primary winding 140A of the transformer 140. Then, a starting current formed at the start-up constant current source 103 flows to charge the capacitor 132 connected to VCC via the switch 102A of the regulator 102, thereby the voltage at VCC is raised. Besides, since the switch 102B of the regulator 102 operates so as to make the voltage at VDD constant, the capacitor 133 connected to VDD via the switch 102B is charged by part of the starting current, thereby the voltage at VDD is also raised.

When the voltage at VCC rises to reach a starting voltage set at the start-up and shut-down circuit 107, the switching operation of the switching device 101 is started, following which energy is supplied to each winding of the transformer 140, so that current flows into the secondary winding 140B and the primary auxiliary winding 140C.

The current flowing through the secondary winding 140B is rectified by the diode 150 and smoothed by the capacitor 151 into a direct-current power, so that the power is supplied to the load 157. The output voltage VO rises gradually through the switching operation repeated. When the output voltage VO reaches a voltage set by the output voltage detecting resistors 154 and 155, the current which flows into the photodiode 135B is increased by a signal from the secondary control circuit 158.

Then, a current flowing into the phototransistor 135A increases, and a current flowing out of the terminal FB also increases.

When the FB terminal current IFB increases, a voltage VFBO inputted to the comparator 108 decreases, so that the drain current IDS flowing into the switching device 101 becomes small. As a result, the output voltage VO is stabilized by such an application of negative feedback.

The current flowing into the primary auxiliary winding 140 is rectified by the diode 131 and smoothed by the capacitor 132. Moreover, the current is utilized as an auxiliary power for the semiconductor device 130 to be supplied to the VCC terminal. When once the voltage at VCC reaches the starting voltage, the switch 102A of the regulator 102 is turned OFF, so that the current of the semiconductor device after the starting is supplied from the primary auxiliary winding 140C. Since the polarity of the primary auxiliary winding 140C is the same as that of the secondary winding 140B, the voltage at VCC is proportional to the output voltage VO.

When the output current IO flowing into the load 157 decreases after the stabilization of the output voltage VO, the feedback current IFB increases, the voltage VFBO inputted to the comparator 108 decreases, and the drain current flowing into the switching device 101 becomes small.

Also, when the output current IO flowing into the load 157 increases, the feedback current IFB decreases, the voltage VFBO inputted to the comparator 108 rises, and the drain current flowing into the switching device 101 becomes large as IO increases. When VFBO increases and then reaches a voltage defined by the clamp circuit 112, the overcurrent protecting function is performed, and the drain current is clamped by a constant current ILIMIT.

As described above, the maximum value of the primary drain current is fixed, so that a maximum power suppliable to the secondary load is limited. However, there come up problems that when the maximum power limited under peak load is applied using ILIMIT, the power is too high as the overload protection level under normal load, and when ILIMIT is applied as the overload protection level under normal load, power cannot be sufficiently supplied to the load under peak load.

FIG. 10 is a circuit diagram of another conventional switching power supply unit having an overload protecting function as a power supply. FIG. 10 is different from FIG. 8 in that an output current detection resistor 159, an overcurrent detection circuit 160, an overcurrent signal transmission circuit 136 are provided. In FIG. 10, when an output current IO exceeds a constant value, the current flowing into a photodiode 136B increases, and then the current flows from a power supply voltage terminal VDD into GND via a phototransistor 136A. Thereafter, the voltage at the VDD terminal decreases, a stop signal is output from a start-up and shut-down circuit 107, the switching operation of a switching device 101 stops, and the overload protecting function operates as the power supply, so that it becomes possible to realize the overload protecting function as the power supply when its drain current is smaller than ILIMIT. That is, when a time delay is provided for the detection at the overcurrent detection circuit 160, the protection against the peak load can be gained by ILIMIT, and the overload protection during normal operation can be gained by the drain current smaller than ILIMIT. In the configuration shown in FIG. 10, however, the element count increases inevitably.

As conventional techniques of varying an overcurrent detection level according to load variations, there have been methods for performing overcurrent protecting operation through the provisions of an overcurrent detecting system commensurate-with maximum rated loads and of another overcurrent detecting system commensurate with loads lower than the maximum rated loads. For instance, the configurations are described in JP-A No. 6-38518.

Generally, it is necessary for switching power supply units to have a protective function under overload. When a peak load condition is imposed as a load condition, it is desired that the overload protection level under normal load be set in a manner that the protective function is activated under overload but not activated under peak load. Because of this, protective functions commensurate with loads are generally provided.

Furthermore, to cope with such a provision, it becomes necessary to take additional measures such as the stop of the primary switching operation through the detection of the secondary output current, so that there also come up problems of increases in production cost and element count and of complex power supply circuit configuration.

SUMMARY OF THE INVENTION

An object of the present invention is to provide a switching power supply unit and a semiconductor device for the switching power supply unit which have no increase in component count, entail no increase in production cost, have no complex circuit configuration as a power supply, and are capable of achieving overload protection under normal load and overcurrent protection against peak load.

The switching power supply unit according to the invention is a switching power supply unit which does output through the conversion of an inputted first direct-current voltage to a second direct-current voltage via a transformer.

The switching power supply unit is provided with a switching device, an output voltage control circuit, a control signal transmission circuit, and a control circuit. The switching device is connected to the primary side of the transformer to which the first direct-current voltage is applied. The output voltage control circuit stabilizes the second direct-current voltage. The control signal transmission circuit transmits a signal from the output voltage control circuit to the primary side of the transformer. The control circuit controls the operation of the switching device.

The control circuit has a switching device current detection circuit, a feedback signal control circuit, a comparator, a switching signal control circuit, a clamp circuit, an overload protection delay time control circuit, a capacitor for adjusting overload protecting operation delay time, and an overload signal output circuit. The switching device current detection circuit detects a signal flowing through the switching device and outputs the current as a device current detecting signal. The feedback signal control circuit receives the signal from the control signal transmission circuit as a feedback signal, outputs a feedback output signal varying according to the feedback signal, and outputs a charging start signal for overload protection when the feedback signal reaches a specified feedback signal level. The comparator compares the output signal from the switching device current detection circuit with the feedback output signal and outputs the comparison signal thus produced. The switching signal control circuit controls the amount of the current and the output of the switching device based on the comparison signal. The clamp circuit fixes the maximum value of the feedback output signal and limits the maximum value of the current of the switching device. The overload protection delay time control circuit receives the charging start signal for the overload protection as input and supplies a charging current. The capacitor for adjusting overload protecting operation delay time is charged with the charging current of the overload protection delay time control circuit. The overload signal output circuit detects the voltage at the capacitor for adjusting the overload protection delay time and outputs a switching shut-down signal when the voltage exceeds a specified voltage.

The switching signal control circuit controls the peak value of the current of the switching device according to the feedback signal to the feedback signal control circuit and stops the operation of the switching device based on the switching shut-down signal from the overload signal output circuit.

According to such a configuration, the signal from the secondary control circuit is transmitted as the feedback signal to the input terminal of one feedback signal control circuit via one control signal transmission circuit, the peak value of the current of the primary switching device is controlled according to the feedback signal, so that the overload protection against the normal load and the overcurrent protection against the peak load can be realized concurrently and readily by the signal transmitted to the primary side through the same control signal transmission circuit.

Besides, since the protecting operation delay time until the stop of the switching operation through the overload protecting operation can be freely adjusted by an external capacitor, it is possible to deal with the wide-ranging peak load irrespective of the load level thereof.

In this configuration, an output voltage generation circuit and an auxiliary power supply voltage generation circuit is further included. The output voltage generation circuit is connected to the secondary winding of the transformer, generates the second direct-current voltage whose absolute value is smaller than that of the first direct-current voltage from the first direct-current voltage through the rectification and smoothing of the secondary output voltage at the transformer, and outputs the second direct-current voltage, and the auxiliary power supply voltage generation circuit is connected to the auxiliary winding of the transformer, generates primary output voltage, and rectifies and smooths the generated primary output voltage to generate the auxiliary power supply voltage used as the power supply voltage for the control circuit.

In the configuration described above, the control signal transmission circuit transmits the signal from the output voltage control circuit to the primary side of the transformer in one system.

In the feedback signal control circuit included in the configuration, the feedback signal at the time when the feedback output signal starts to be fixed at a maximum value corresponds to a first feedback signal level, a current which is able to flow to the switching device at the first feedback signal level becomes maximum, and when the feedback signal is at the specified feedback signal level, the first feedback signal level and the specified feedback signal level are set in a manner that a current smaller than the maximum current which is able to flow flows into the switching device.

The feedback signal control circuit included in the configuration is provided with a constant current source for detecting the specified feedback signal level used for detecting the feedback signal which has reached the specified feedback signal level and outputs the charging start signal for the overload protection through the comparison of the current value of the constant current source for detecting the specified feedback signal level and the current value proportional to the feedback signal.

In the configuration, the feedback signal control circuit is provided with a charging start detection comparator for the overload protection which compares the feedback output signal and a charging start detecting reference voltage source for the overload protection specified therein and which outputs the charging start signal for protecting the overload protection when the comparator has detected the specified feedback signal level as the feedback output signal.

The feedback signal control circuit included in the configuration is provided with a light-load mode detection comparator, which compares the feedback output signal and a light-load reference voltage source specified therein, and performs the current peak control and the intermittent operation of the switching device according to the feedback signal to the feedback signal control circuit.

In the configuration, the control circuit is further provided with an oscillator which generates and outputs a switching signal applied to the switching device.

In the configuration, the overload signal output circuit outputs the switching operation stop signal through the detection of a rise in the voltage at the capacitor for adjusting the overload protection delay time to a first specified voltage and outputs a signal which restarts the switching operation of the switching device through the detection of a decrease in the voltage at the capacitor for adjusting the overload protection delay time below a second specified voltage.

The overload protection delay time control circuit stops charging to the capacitor for adjusting the overload protecting operation delay time to keep a state where discharge current is flowed for a fixed time period.

In the configuration, the overload signal output circuit outputs the switching operation stop signal in a latch mode through the rise in the voltage at the capacitor for adjusting the overload protection delay time to the specified voltage.

The semiconductor device for the switching power supply according to the invention is a semiconductor device which has a control circuit and is used for the switching power supply unit which comprises:

the switching device connected to the primary side of the transformer to which the first direct-current voltage is input;

the output voltage control circuit which stabilizes the second direct-current voltage to become an output of the secondary side of the transformer;

the control signal transmission circuit which transmits the signal from the output voltage control circuit to the primary side of the transformer; and the control circuit which controls the operation of the switching device.

The control circuit has the switching device current detection circuit, the feedback signal control circuit, the comparator, the switching signal control circuit, the clamp circuit, the overload protection delay time control circuit, the capacitor for adjusting the overload protecting operation delay time, and the overload signal output circuit. The switching device current detection circuit detects the current flowing through the switching device to output the current as the device current detection signal. The feedback signal control circuit receives the signal from the control signal transmission circuit as the feedback signal, outputs the feedback output signal varying in response to the feedback signal, and outputs the charging start signal for the overload protection when the feedback signal has reached the specified feedback signal level. The comparator compares the output signal from the switching device current detection circuit and the feedback output signal to output the comparison signal thus produced. The switching signal control circuit controls the amount of the current and the output of the switching device based on the comparison signal. The clamp circuit fixes the maximum value of the feedback output signal to limit the maximum value of the current of the switching device. The overload protection delay time control circuit receives the charging start signal for the overload protection as the input to supply the charge current. The capacitor for adjusting the overload protecting operation delay time is charged with the charge current of the overload protection delay time control circuit. The overload signal output circuit detects the voltage at the capacitor for adjusting the overload protecting operation delay time and outputs the switching stop signal when the voltage has exceeded the specified voltage.

The switching signal control circuit controls the peak value of the current of the switching device according to the feedback signal to the feedback signal control circuit and stops the operation of the switching device based on the switching stop signal of the overload signal output circuit.

In the feedback signal control circuit included in the configuration, the feedback signal at the time when the feedback output signal starts to be fixed at a maximum value corresponds to a first feedback signal level, a current which is able to flow into the switching device at the first feedback signal level becomes maximum, and when the feedback signal is at the specified feedback signal level, the first feedback signal level and the specified feedback signal level are set in a manner that a current smaller than the maximum current which is able to flow flows into the switching device.

With the feedback signal control circuit included in the configuration, the absolute value of the current of the feedback signal at the first feedback signal level is smaller than that of the current of the feedback signal at the specified feedback signal level.

The feedback signal control circuit included in the configuration is provided with the constant current source for detecting the specified feedback signal level used for detecting the feedback signal which has reached the specified feedback signal level and outputs the charging start signal for the overload protection through the comparison of the current value of the constant current source for detecting the specified feedback signal level and the current value proportional to the feedback signal.

The feedback signal control circuit included in the configuration is provided with the charging start detection comparator for the overload protection which compares the feedback output signal and the charging start detecting reference voltage source for the overload protection specified therein and which outputs the charging start signal for the overload protection when the comparator has detected the specified feedback signal level as the feedback output signal.

The feedback signal control circuit included in the configuration is provided with the light-load mode detection comparator, which compares the feedback output signal and the light-load reference voltage source specified therein, and performs the current peak control and the intermittent operation of the switching device according to the feedback signal to the feedback signal control circuit.

The control circuit included in the configuration is further provided with the oscillator which generates and outputs the switching signal applied to the switching device.

The overload signal output circuit included in the configuration outputs the switching operation stop signal through the detection of the rise in the voltage at the capacitor for adjusting the overload protection delay time to the first specified voltage, and detects the decrease in the voltage at the capacitor for adjusting the overload protection delay time below the second specified voltage to output the output signal which restarts the switching operation of the switching device.

The overload protection delay time control circuit stops the charging to the capacitor for adjusting the overload protecting operation delay time to keep the state in which the discharge current is flowed for the fixed time period.

The overload signal output circuit included in the configuration outputs the switching operation stop signal in the latch mode through the rise in the voltage at the capacitor for adjusting the overload protection delay time to the specified voltage.

In the configuration according to the invention, the switching device and the control circuit are formed on the same semiconductor substrate.

DESCRIPTION OF THE PREFERRED EMBODIMENTS

In the following, embodiments of the present invention will be described with reference to the drawings.

First Embodiment

Figure 1:
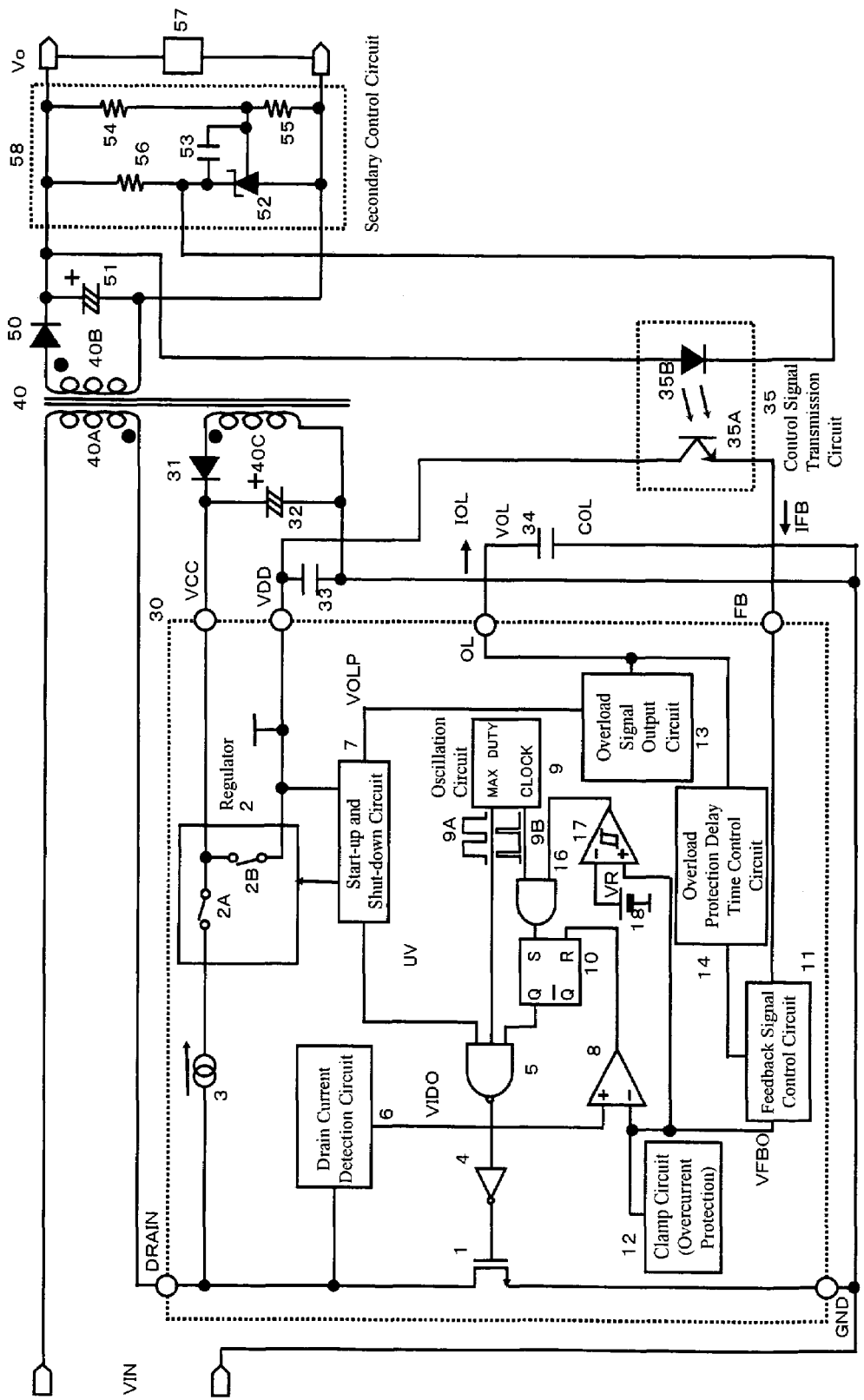
FIG. 1 is a circuit diagram of a switching power supply unit according to a first embodiment of the present invention.
Figure 2:
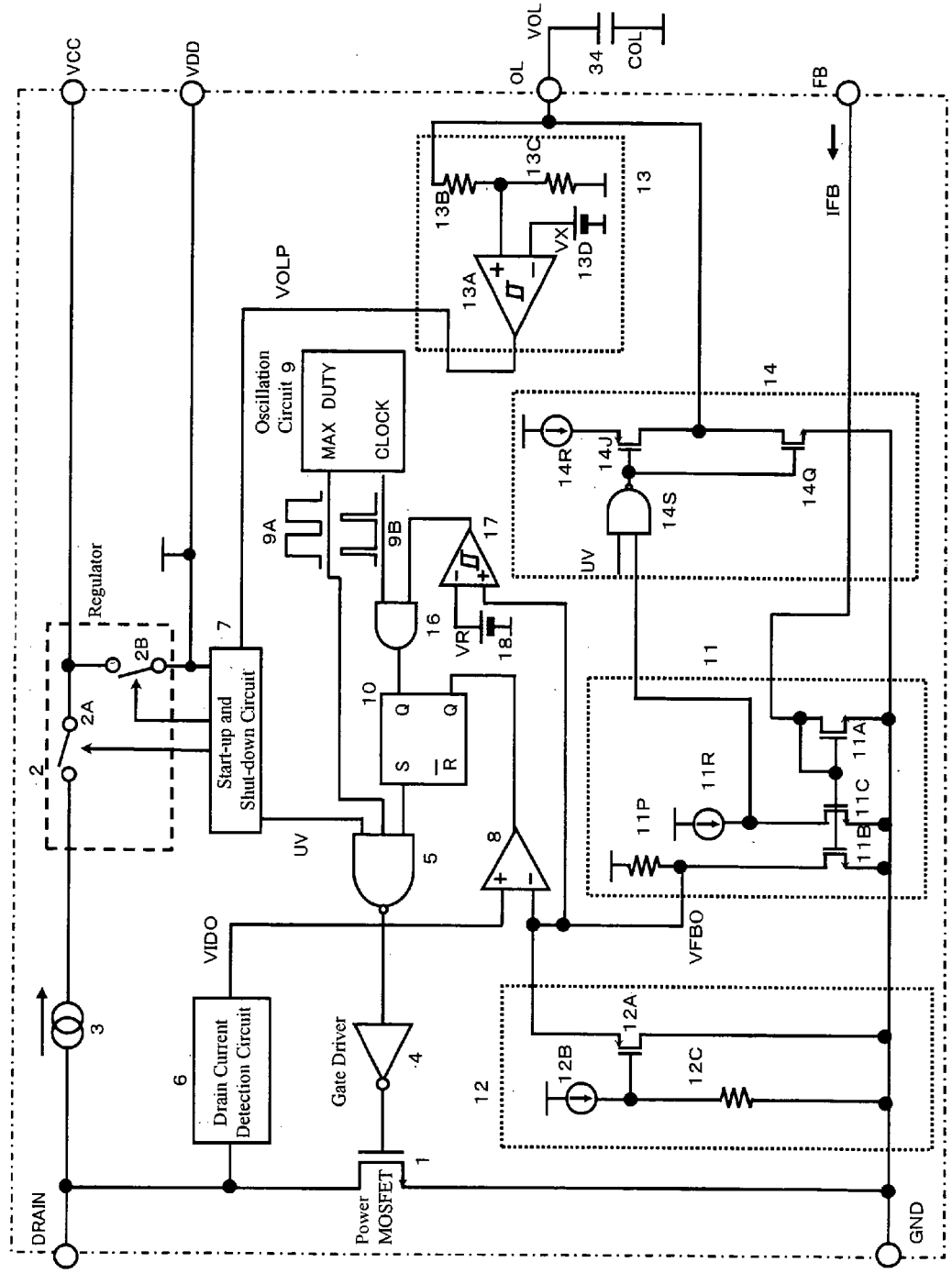
FIG. 2 is a circuit diagram of a semiconductor device included in the switching power supply unit according to the first embodiment of the invention.

FIG. 1 is a circuit diagram of a switching power supply unit and a semiconductor device according to a first embodiment of the invention. FIG. 2 is a detailed circuit diagram for explaining the configuration of the semiconductor device 30 for controlling the switching power supply shown in FIG. 1.

In FIGS. 1 and 2, reference numeral 30 denotes the semiconductor device for controlling the switching power supply. The semiconductor device 30 includes a switching device 1 and its control circuit.

The semiconductor device 30 is provided with the input terminal (DRAIN) of the switching device 1, an auxiliary power supply voltage input terminal (VCC), an internal circuit power supply terminal (VDD), a feedback signal input terminal (FB), a capacitor connecting terminal (OL) for adjusting the delay time of overload protecting operation, the output terminal of the switching device 1, and the GND terminal (GND) of the control circuit as external input terminals.

Reference numeral 2 is a regulator which supplies internal circuit power supply of the semiconductor device 30. The regulator is provided with a switch 2A which flows starting current to VCC and a switch 2B which supplies the current from VCC to VDD.

The switch 2A is in the ON state until voltage at VCC reaches a constant voltage to supply the starting current to VCC. The switch 2B supplies the current from VCC to VDD until potential at VDD reaches a constant potential. When the constant potential is reached, VDD is held at the constant potential by stopping the supply of the current.

Reference numeral 3 is a start-up constant current source which supplies circuit current for starting. The start-up constant current source 3 supplies the starting current to VCC via the switch 2A at the time of start up.

Reference numeral 7 is a start-up and shut-down circuit which controls the start up and the shut down of the semiconductor device 30. The start-up and shut-down circuit 7 detects voltage at VDD and outputs a signal which stops the switching operation of the switching device 1 to a NAND circuit 5 when the voltage at VDD is below a constant voltage. Also, the start-up and shut-down circuit 7 controls the switches 2A and 2B as described above.

Furthermore, by receiving an output VOLP from an overload signal output circuit 13, a "L" signal is output from the start-up and shut-down circuit 7 to the NAND circuit 5. Thereafter, a "H" signal is input to a gate driver 4, and then a "L" signal is output from the gate driver 4, thereby the switching operation of the switching device 1 is stopped.

Reference numeral 6 is a drain current detection circuit which detects current flowing into the switching device 1. The detected signal is converted to a voltage signal, and then the signal is output to a comparator 8.

Reference numeral 11 is a feedback signal control circuit, which converts a current signal IFB flowing out of the FB terminal to a voltage signal to output the signal to the comparator 8.

The comparator 8 outputs the signal to the reset terminal of a RS flip-flop circuit 10 when the output signal from the feedback signal control circuit 11 has become equal to the output signal from the drain current detection circuit 6. As described above, the signal is processed in a manner that the reset signal is output to the reset terminal of the RS flip-flop circuit 10, and the switching device 1 is turned OFF via the NAND circuit 5 and the gate driver circuit 4. Here, the gate driver circuit 4, the NAND circuit 5, and the RS flip-flop circuit 10 is included in a switching signal control circuit which controls the switching device 1.

Reference numeral 12 is a clamp circuit which determines the maximum value of the output signal VFBO of the feedback signal control circuit 11 which varies according to the feedback current (IFB). The clamp circuit determines the maximum value (ILIMIT) of the current flowing into the switching device 1 and has the function of protecting the overcurrent at the switching device 1. The feedback current at the time when IFB varies and the current flowing into the switching device 1 reaches ILIMIT is a first feedback current (IFB1) (see FIG. 3).

Reference numeral 14 is an overload protection delay time control circuit. The overload protection delay time control circuit 14 detects the feedback current which has reached a second feedback current (IFB2), receives a charging start current for the overload protection outputted from the feedback signal control circuit 11 as an input signal to one side of a NAND circuit 14S as shown in FIG. 2, and receives a starting signal (UV) of the start-up and shut-down circuit 7 as a signal to the other side of the NAND circuit 14S. thereafter, when the feedback current reaches IFB2 in the starting state in which the switching device 1 is performing the switching operation, charging current is supplied to a capacitor 34 (COL) for adjusting the overload protecting operation delay time. The peak current of the switching device 1 (IDP2) during the feedback effected by the start of the charging to COL 34 is set in a manner that the value of IDP2 becomes smaller than the maximum value of the current flowing into the switching device (ILIMIT).

Reference numeral 13 is the overload signal output circuit. When voltage at the connecting terminal (OL) of the capacitor for adjusting the overload protecting operation delay time connected to the capacitor for adjusting the overload protecting operation delay time 34 (COL) exceeds a constant voltage, the overload signal output circuit 13 outputs the overload signal (VOLP) to the start-up and shut-down circuit 7 to stop the switching operation of the switching device 1. Also, when the switching stops concurrently, the starting signal (UV) is inverted, the output signal of the NAND circuit 14S becomes "H", and the charging current to the capacitor for adjusting the overload protecting operation delay time 34 (COL) is shut down, thereby the charge of COL 34 is discharged.

Figure 3:
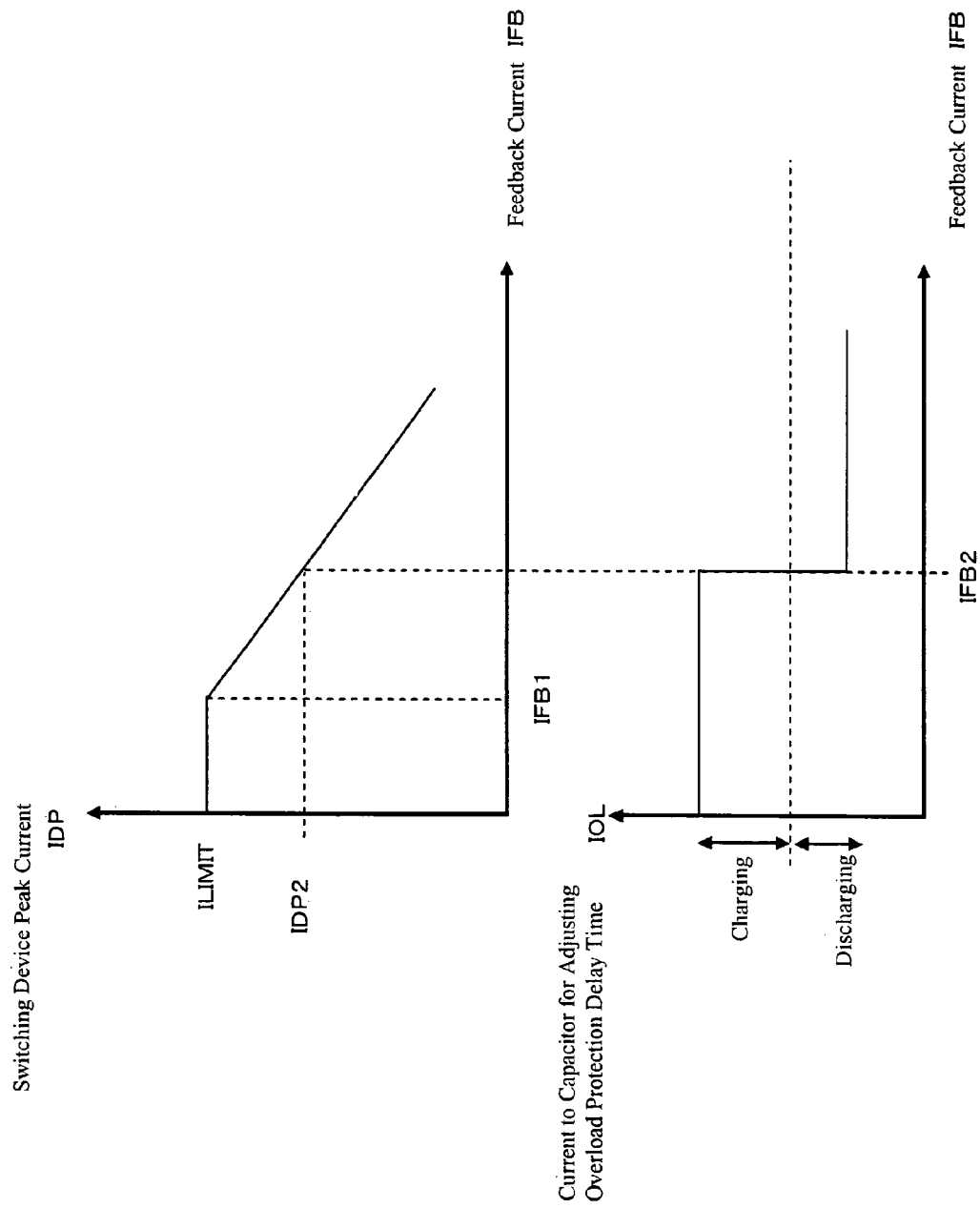
FIG. 3 is a graph for explaining the dependence of a switching device current and a capacitor for adjusting overload protection delay time on feedback current of the switching power supply unit of the invention.

FIG. 3 is a graph explaining a relationship between the feedback current IFB and the peak current IDP flowing into the switching device 1, a relationship between IFB1–IFB2 and ILIMIT-IDP2, and a relationship between IFB and a charge-discharge state IOL.

As shown in FIG. 3, when the switching current exceeds IDP2, the charging to the capacitor 34 (COL) is started, and after a fixed duration in time, the switching operation is stopped by the overload protecting operation. At this time, it is possible to feed the switching device current to the extent of ILIMIT at its maximum until the switching operation stops, so that power necessary for peak load can be fed to the secondary side for a fixed duration in time.

Reference numeral 17 is a light-load detecting comparator, to which a light-load reference voltage source 18 is connected as reference voltage VR. The comparator 17 is set so as to output a "L" signal when the drain current peak value of the switching device 1 decreases to about 15% of the overcurrent protection level ILIMIT and to output a "H" signal so that the drain current recover to about 20% of ILIMIT. That is, the light-load reference voltage source 18 outputs either of the two voltages in response to the output of the comparator.

Reference numeral 9 is an oscillation circuit, which outputs a maximum duty-cycle signal 9A, which determines the maximum duty cycle of the switching device 1, and a clock signal 9B which determines the oscillation frequency of the switching device 1. The maximum duty-cycle signal 9A is input to the NAND circuit 5, and the clock signal 9B is input to an AND circuit 16.

The output signal of the light-load detecting comparator 17 and the clock signal 9B from the oscillation circuit 9 are input to the AND circuit 16, and the AND circuit 16 outputs a signal to the set terminal of the RS flip-flop circuit 10. That is, only when the signal from the light-load detecting comparator 17 is a "H", the clock signal 9B is input to the set terminal of the RS flip-flop circuit 10.

The output signal of the start-up and shut-down circuit 7, the maximum duty-cycle signal 9A, and the output signal of the RS flip-flop circuit 10 are input to the NAND circuit 5. The output signal of the NAND circuit 5 is input to the gate drive circuit 4 to control the switching operation of the switching device 1.

Reference numeral 40 is a transformer, which has a primary winding 40A, a secondary winding 40B, and a primary auxiliary winding 40C.

A rectifying-smoothing circuit composed of a diode 31 and a capacitor 32 is connected to the primary auxiliary winding 40C. The primary auxiliary winding 40C is used as the auxiliary power supply section of the semiconductor device 30, and the power of the auxiliary power supply section is input to VCC.

Reference numeral 33 is a capacitor for stabilizing VDD.

Reference numeral 35 is a control signal transmission circuit, which transmits a control signal from the secondary side to the primary side. In this embodiment, to secure the overload protecting operation under normal conditions and overcurrent protecting operation against the peak load, it is necessary and sufficient for only a control signal transmission circuit 35 to be present. The control signal at the secondary side can be detected relatively easily by using a plurality of transmission circuits. However, such a configuration becomes complex as a power supply unit and causes increases in element count and production cost. In this invention, such problems are solved by handling two controls through the use of one transmission circuit.

The control signal transmission circuit 35 includes a phototransistor 35A and a photodiode 35B. The collector of the phototransistor 35A is connected to the terminal VDD, and the emitter of the phototransistor 35A is connected to the terminal FB.

A rectifying-smoothing circuit composed of a diode 50 and a capacitor 51 is connected to the second winding 40B, and then the second winding 40B is connected to the photodiode 35B, a secondary control circuit 58, and a load 57.

The secondary control circuit 58 includes a shunt regulator 52, resistors 54, 55, and 56, and a capacitor 53, inputs voltage divided by the resistors 54 and 55 for detecting secondary output voltage VO to the reference terminal of the shunt regulator 52, and controls current which flows into the photodiode 35B connected to the cathode of the shunt regulator 52 in a manner that the secondary output voltage VO becomes constant.

Figure 4:
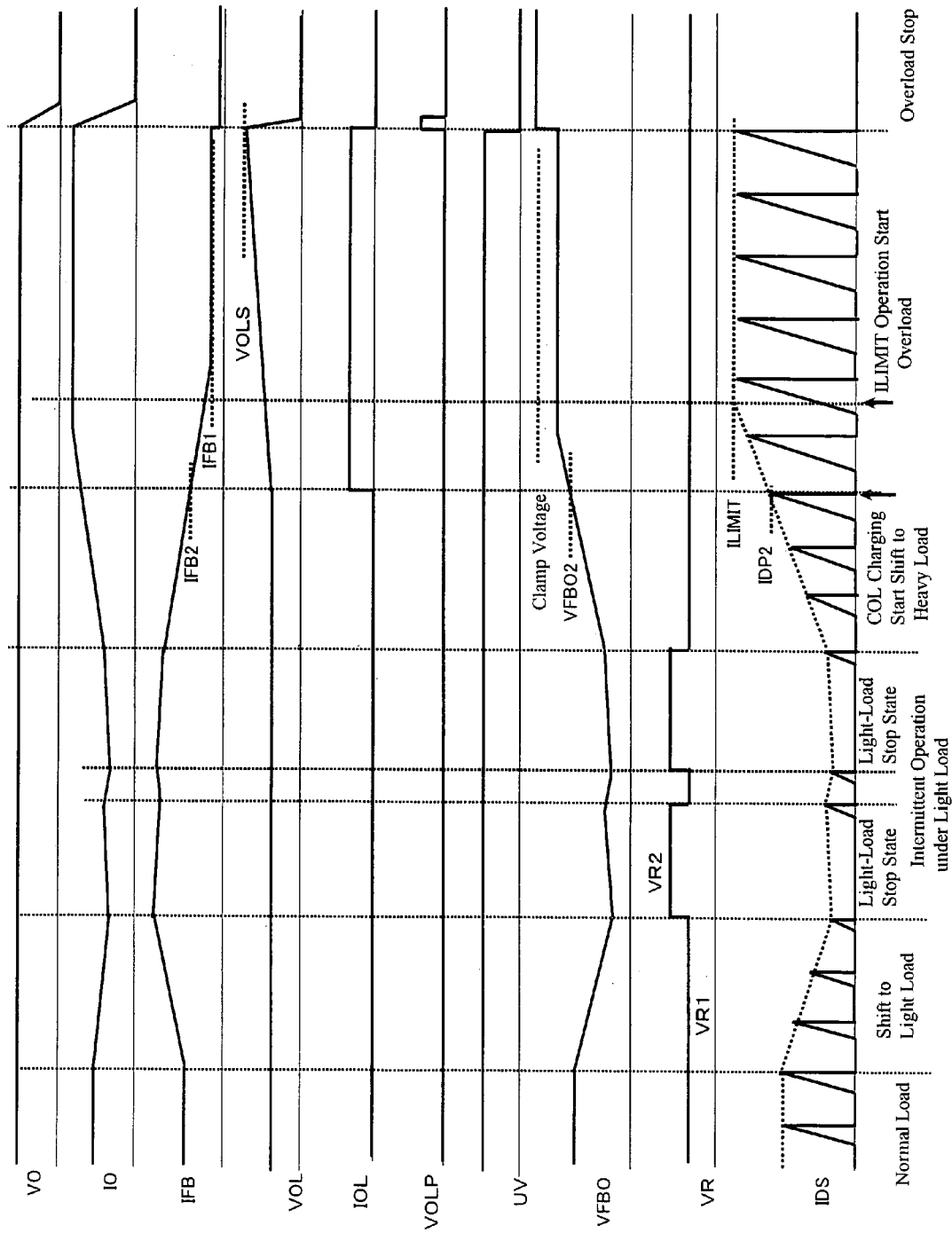
FIG. 4 is a time chart for explaining operations of the switching power supply unit of the invention under light load and overload.
Figure 5:
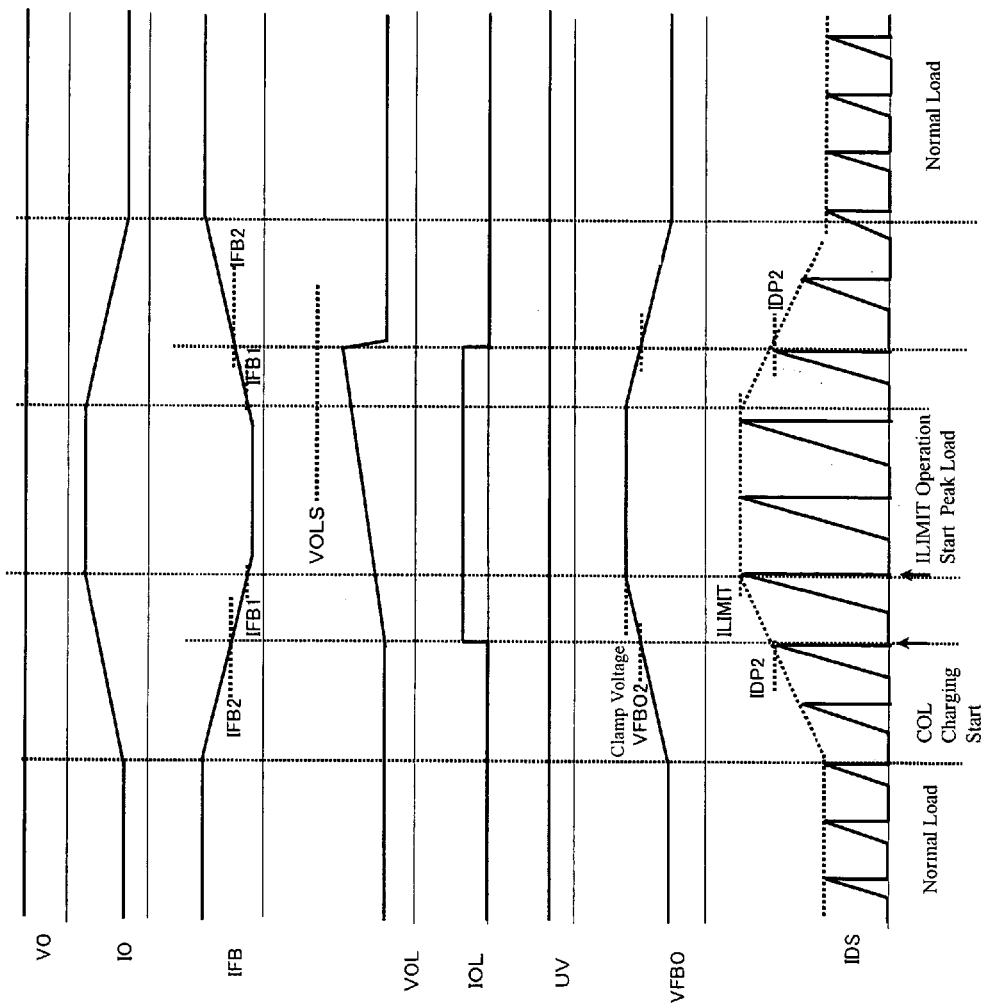
FIG. 5 is a time chart for explaining operations of the switching power supply unit of the invention under peak load.

The operation of the switching power supply unit having such a configuration will be described with reference to FIGS. 1, 2, 4, and 5. FIG. 4 is a time chart of the operation waveform of each section shown in FIG. 1 under light load, and FIG. 5 is a time chart of the operation waveform of each section shown in FIG. 1 under peak load.

In FIG. 1, direct-current voltage VIN produced by rectifying and smoothing commercial alternating-current power supply, for instance, is input to the input terminal. VIN is applied to the drain terminal of the semiconductor device 30 via the primary winding 40A of the transformer 40. Then the starting current produced at the start-up constant current source 3 flows to charge the capacitor 32 connected to VCC via the switch 2A of the regulator 2, thereby the voltage at VCC is raised. Besides, since the switch 2B of the regulator 2 operates in a manner that the voltage at VDD becomes constant, the capacitor 33 connected to VDD via the switch 2B is charged by part of the starting current, thereby the voltage at VDD is also raised.

After the voltage at VCC has risen and then reached starting voltage set at the start-up and shut-down circuit 7, the switching operation of the switching device 1 is started. When the switching operation is started, energy is supplied to each winding of the transformer 40, so that a current flows into the secondary wiring 40B and the primary auxiliary winding 40C.

The current which has passed through the secondary winding 40B is rectified by the diode 50 and smoothed by the capacitor 51 into direct-current power, and then the power is supplied to the load 57.

The output voltage VO rises gradually through the repeated switching. When the output voltage VO reaches the voltage set by the output voltage detecting resistors 54 and 55, the current which flows into the photodiode 35B increases through the transmission of signals from the secondary control circuit 58. Thereafter, current which flows into the phototransistor 35A increase, and current which flows into the FB terminal also increases.

When the FB terminal current IFB increases, the voltage VFBO input to the comparator 8 decreases, so that the drain current flowing into the switching device 1 becomes small. As a result, the output voltage VO is stabilized by the application of such a negative feedback.

The operation effected by a shift from the normal state to the overload state will be described with reference to FIGS. 1 and 4.

When the secondary load 57 turns into the overload state, the output voltage VO decreases, the decrease in the output voltage VO is detected by the resistance division of the resistors 54 and 55 of the secondary control circuit 58, a voltage which is proportionate to the output voltage is input to the reference terminal of the shunt regulator 52, the current flowing into the photodiode 35B decreases, and finally no current flows to the photodiode 35B to decrease the feedback current flowing via the phototransistor 35A. When IFB reaches the second feedback current (IFB2), the charging current (IOL) is supplied to the capacitor 34 (COL) for adjusting the overload protecting operation delay time.

As a result, OL terminal voltage (VOL) increases. When VOL has reached a specified voltage VOLS, the signal VOLP is output from the overload signal output circuit 13 to stop the switching operation. Then, the signal VOLP is input to the start-up and shut-down circuit 7, after which the signal is output from the start-up and shut-down circuit 7 to stop the switching operation. At this time, a signal for forcedly discharging the OL terminal is also concurrently transmitted from the start-up and shut-down circuit 7 to the overload protection delay time control circuit 14, so that the OL terminal voltage decreases.

That is, when a current exceeding the switching device current IDP2 lower than ILIMIT flows for a fixed duration in time without reaching the overcurrent protection level ILIMIT of the switching device 1, a constant-current charge to the OL terminal is started, and the voltage VOL at the OL terminal to which the capacitor 34 for adjusting the overload protection delay time is connected rises. When the voltage VOL has reached the specified voltage VOLS, the overload protecting operation is effected, so that the switching operation stops. In the switching operation, since the charging time of the capacitor 34, i.e., the rise time of the voltage VOL, can be adjusted by adjusting the capacitance of the capacitor 34 for adjusting the overload protection delay time, it becomes possible to freely set a delay time between the beginning of the overload state and the actual stop of the switching operation trough the overload protecting operation.

By employing such an operation, when a normal load state has changed into an overload state, the overload protecting operation is effected after a fixed delay time.

Also, the operation effected by a shift from the normal load state to the peak load state will be described with reference to FIGS. 1 and 5.

When the secondary load 57 has been brought into the peak load state, the output voltage VO decrease, and then the decrease in the output voltage VO is detected by the resistive division of the resistors 54 and 55 of the secondary control circuit 58, following which a voltage proportionate to the output voltage is input to the reference terminal of the shunt regulator 52. Furthermore, the current flowing into the photodiode 35B decreases, and finally no current flows into the photodiode 35B. Then, the feedback current IFB flowing via the phototransistor 35A decreases, the switching device current increases according to IFB, and the current being at the overcurrent protection level ILIMIT flows at its maximum. When IFB has reached the second feedback current IFB2 before reaching ILIMIT, the charging current IOL starts to be supplied to the capacitor 34 for adjusting overload protecting operation delay time, thereby the OL terminal voltage VOL is increased.

However, even when the switching device current has reached ILIMIT, the switching operation does not stop for a time period for which the OL terminal voltage VOL determined by the selection of the capacitor 34 for adjusting overload protecting operation delay time and the charging current IOL to the capacitor 34 rises to the specified voltage VOLS, so that it is possible to not only deal with the peak load, but keep the output voltage VO at a normal value. Therefore the duration of the peak load can be adjusted by freely selecting the capacitor 34 for adjusting overload protecting operation delay time.

A shift from the normal operation to light-load intermittent operation and a shift from the light-load intermittent operation to return operation will be described with reference to FIGS. 1 and 4.

When the normal load state shifts to the light-load state, the secondary control circuit 58 detects a miniscule rise in the output voltage VO, and the reference terminal voltage of the shunt regulator 52 rises. Because of this, drawing current from the cathode of the shunt regulator 52 increases, the current flowing trough the photocoupler 35B increases, and the FB terminal current IFB increases via the phototransistor 35A.

As a result, the output voltage VFBO of the feedback signal control circuit 11 decreases, and the peak value of the drain current IDS flowing through the switching device 1 gradually decreases. Furthermore, when the load has been reduced, IFB further decreases, the output voltage VFBO decreases, and the peak value of the drain current IDS also decreases further.

Thereafter, IFB increases further. When the output voltage VFBO has fallen below a light-load lower-limit voltage VR1, the "L" signal is output from the light-load mode detecting comparator 17, thereby the switching operation is stopped to shift to a light-load stop state. At this time, concurrently with the stop of the switching operation, the light-load reference voltage source 18 changes its voltage to a light-load upper-limit voltage VR2.

After the stop of the switching operation, the secondary control circuit 58 detects a miniscule fall in the output voltage VO, and the reference terminal voltage of the shunt regulator 52 drops, so that the drawing current from the cathode of the shunt regulator 52 decreases. Furthermore, the current flowing through the photocoupler 35B decreases, the FB current IFB decreases via the phototransistor 35A, and the output voltage VFBO of the feedback signal control circuit 11 rises. When the output voltage VFBO has reached the light-load upper-limit voltage VR2, the switching operation is restarted. So long as the light-load state and the no-load state continue, such an operation is repeated; that is, in the switching operation of the switching device 1, the intermittent operation is effected where the durations of the switching operation and the stop of the switching operation are repeated alternately.

As a result, it becomes possible to reduce power consumption in the light-load state and the no-load state. At the time of the light-load intermittent operation, the value of the light-load reference voltage source is set in a manner that the peak value of the drain current at the time of the shift from the switching operation to the light-load stop state is set at about 15% of the overcurrent protection level ILIMIT determined by the clamp circuit, and the peak value of the drain current at the time of the shift from the light-load stop state to the operation state is set at about 20% of ILIMIT. Since there come up problems that when the peak value of the drain current during the intermittent operation is too high, transfer noise is effected, and when the peak value is too low, the power consumption is increased, the intermittent operation using the values exemplified above is suitable for the solution of these problems.

FIG. 2 is a circuit diagram of a semiconductor device for controlling a switching power supply included in the switching power supply unit according to the invention. In FIG. 2, the internal circuit of the semiconductor device 30 shown in FIG. 1 is illustrated in detail, and since the reference numerals shown in FIG. 2 correspond with those shown in FIG. 1, the explanation of the same member is omitted.

In FIG. 2, the feedback signal control circuit 11 includes a constant current source 11R, N-type MOSFETs 11A, 11B, and 11C, and a resistor 11P.

When the feedback current IFB acting as the input signal to the feedback signal control circuit 11 increases, a current flowing through the N-type MOSFET 11A increases, and a current flowing through the N-type MOSFET 11B mirror-connected to the N-type MOSFET 11A also increases. As a result, a potential drop at the resistor 11P becomes large, so that the voltage of the output signal VFBO of the feedback signal control circuit 11 decreases.

That is, when the feedback current IFB acting as the input signal of the feedback signal control circuit 11 increases, the output signal VFBO of the feedback signal control circuit 11 decreases, so that the peak value of the drain current of the switching device 1 decreases. In contrast, when the feedback current IFB acting as the input signal of the feedback signal control circuit 11 decreases, the output signal VFBO of the feedback signal control circuit 11 increases, so that the switching device 1 operates to increase the peak value of the drain current.

Furthermore, when the feedback current IFB decreases, the output signal VFBO of the feedback signal control circuit 11 increases, but the maximum value thereof is clamped by the clamp circuit 12.

The clamp circuit 12 includes a P-type MOSFET 12A, a constant current source 12B, and a resistor 12C. The clamp circuit 12 operates so as to clamp VFBO with a voltage generated by the product of a current supplied from the constant current source 12B and the resistance of the resistor 12C and with a voltage determined by the sum of the potentials at the gate and the source of the P-type MOSFET 12A.

The clamping voltage of the clamp circuit 12 determines the maximum current of the switching device 1, i.e., the overcurrent protection level ILIMIT. IFB at the time when VFBO increases through the decrease in IFB and just reaches the clamp voltage, that is, VFBO reaches the maximum current ILIMIT of the switching device 1 is IFB1.

Also, the increase in the feedback current IFB brings about the decrease in the output signal VFBO of the feedback signal control circuit 11, and furthermore, when the output signal VFBO of the feedback signal control circuit 11 decreases to the reference voltage VR of the light-load reference voltage source 18, the "L" signal is output from the light-load mode detection comparator 17 to the AND circuit 16, and the "L" signal is input to the set terminal of the RS flip flop 10, thereby the switching operation of the switching device 1 is stopped.

In contrast, when the feedback current IFB decreases, the current flowing through the N-type MOSFET 11A decreases, and a current flowing through the N-type MOSFET 11C mirror-connected to the N-type MOSFET 11A decreases. At this time, when the current flowing through the N-type MOSFET 11C becomes smaller than a current determined by the constant current source 11R, the "H" signal acting as the current used for the shift to the overload protecting operation is output as one of the two inputs of the NAND circuit 14S of the overload protection delay time control circuit 14.

IFB2 is defined as IFB at the time when IFB decreases, and then the "H" signal is output from the feedback signal control circuit 11 to the overload protection delay time control circuit 14 as described above. IDP2 is defined as the current of the switching device 1 at the time when IFB reaches IFB2.

That is, as shown in FIG. 4, IFB1 and IFB2 have a relationship IFB1<IFB2, and ILIMIT and IDP2 have a relationship ILIMIT>IDP2.

The overload protection delay time control circuit 14 includes the NAND circuit 14S, a P-type MOSFET 14J, a N-type MOSFET 14Q, and a constant current source 14R.

When IFB decreases below IFB2 in the start-up state where the output signal UV from the start-up and shut-down circuit 7 is "H", the "H" signal is input from the feedback signal control circuit 11 to the input portion of the NAND circuit 14S, and a "L" signal is output from the NAND circuit 14S. Then the P-type MOSFET 14J is turned ON, the N-type MOSFET 14Q is turned OFF, and current from the constant current source 14R starts to be supplied as the charging current used for charging the capacitor 34. That is, when the current of the switching device 1 increases beyond IDP2, the charging current to the capacitor 34 starts to be supplied.

The overload signal output circuit 13 includes a comparator 13A, resistors 13B and 13C, and a reference voltage source 13D and detects a rise in the voltage VOL at the terminal OL to which the capacitor 34 (COL) is connected. When VOL rises until voltage divided by the resistors 13B and 13C becomes equal to the voltage of the reference voltage source 13D, the "H" overload stop signal VOLP is output from the comparator 13A. The signal VOLP is input to the start-up and shut-down circuit 7, thereby the shift to the overload protection stop state is effected to stop the switching operation.

That is, when the time period when the switching device current exceeds IDP2 continues beyond a fixed time period, VOL rises to the specified voltage VOLS, so that the overload protecting operation is effected to stop the switching operation. In contrast, even when the switching device current exceeds IDP2 and then reaches the maximum current ILIMIT, the switching operation is not stopped immediately. The switching operation can be performed for a fixed time period and can be continued until the peak load state is reached.

As a result, the delay time taken until the overload protecting operation is stopped is denoted as TOLP and can be expressed by the following formula:

$$TOLP = C34 \times VOLS / I14R \quad \text{(formula 1)}$$

where VOLS is the voltage at the terminal OL at the time when the voltage at the terminal OL is raised and the "H" signal is output as VOLO, I14R is the current value of the constant current source 14R, and C34 is the capacitance of the capacitor 34.

That is, the overload protection delay time can be freely selected by determining the capacitance of the capacitor 34 freely. In addition, the time taken for a measure against the peak load can be also selected.

Furthermore, the points of the overload protecting operation under the normal load and of the measure against the peak load can be set internally by determining the relationship between IDP2 and ILIMIT.

For instance, when ILIMIT is set at 120% of IDP2, it becomes possible to supply for a fixed time period the primary switching device current 20% larger than that at the point when the overload protecting operation is effected under normal load, which facilitates the measure against the peak load while performing the overcurrent protecting operation.

VOL reaches VOLS through the overload protecting operation, and then the reference voltage source 13D shows a first reference voltage VX1. However, as operation after the stop of the switching operation, the voltage at the reference voltage source 13D changes to a second reference voltage VX2 lower than the first reference voltage. Also, the starting signal UV changes from the "H" state to the "L" state through the stop of the switching operation, and then the output signal of the NAND circuit 14S changes from the "L" state to the "H" state. Furthermore, the P-type MOSFET 14J is turned OFF and the N-type MOSFET 14Q is turned ON, following which the current IOL charged at the capacitor 34 is discharged. Thereafter, the switching operation is kept in the stop state until VOL decreases to the specified voltage. When the voltage gained by dividing VOL using the resistors 13B and 13C decreases to the second reference voltage VX2, the signal VOLP is inverted, and the starting signal UV changes from the "L" state to the "H" state, thereby restarting can be effected.

Second Embodiment

Figure 6:
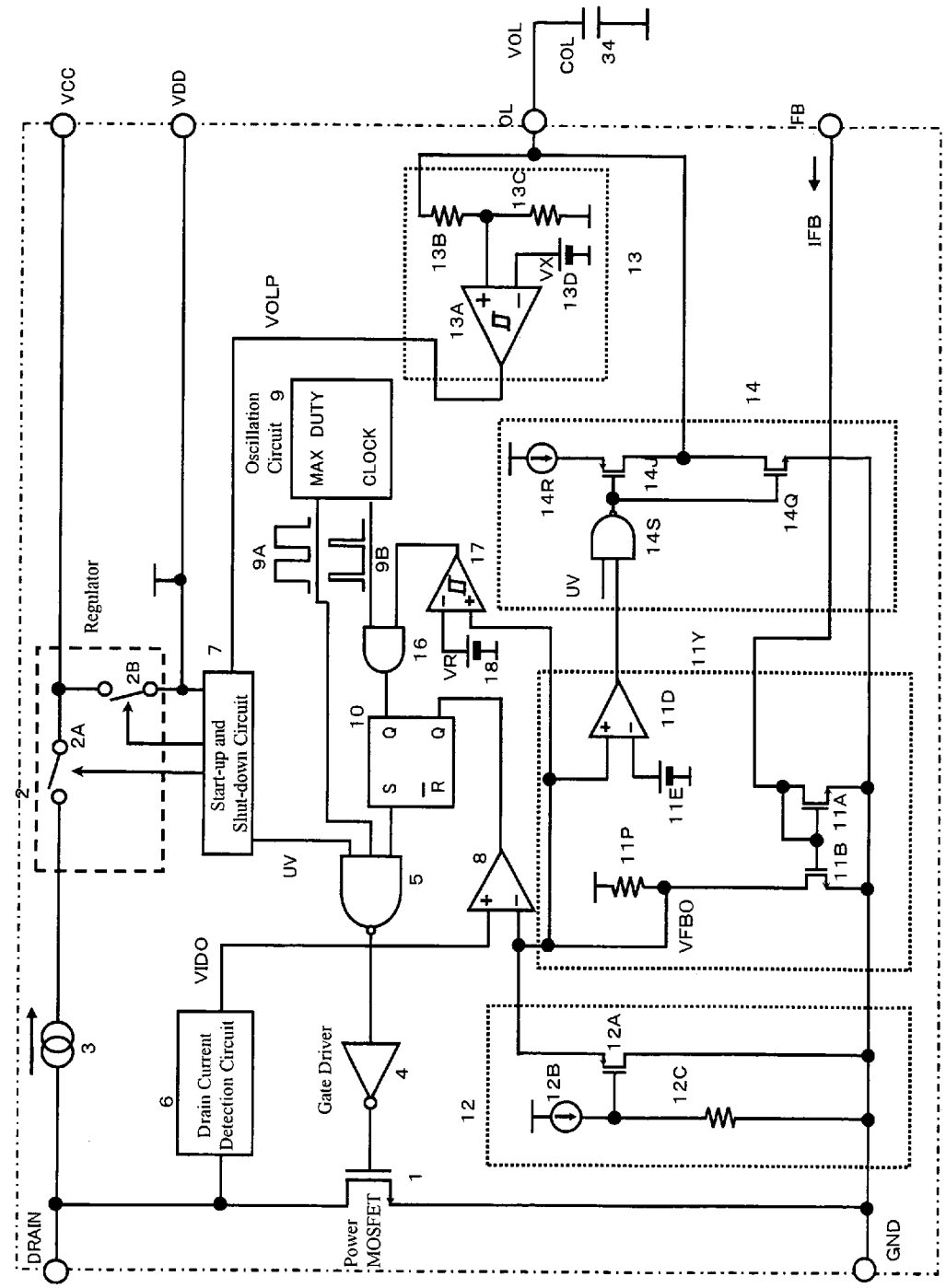
FIG. 6 is a circuit diagram of a semiconductor device included in a switching power supply unit according to a second embodiment of the invention.

FIG. 6 is a circuit diagram of a semiconductor device for controlling a switching power supply included in a switching power supply unit according to a second embodiment of the invention. In FIG. 6, the internal circuit of the semiconductor device 30 shown in FIG. 1 is illustrated in detail, and since reference numerals correspond with those shown in FIG. 1, the explanation of the same component is omitted.

A difference between the configurations shown in FIGS. 6 and 2 is in components in the feedback signal control circuit. That is, as shown in FIG. 6, the feedback signal control circuit 11Y is provided with a comparator 11D and a reference voltage source 11E, the output signal VFBO of the feedback signal control circuit 11Y is input to the comparator 11D, and the output signal of the comparator 11D is input to the overload protection delay time control circuit 14.

Advantages obtained by adopting the configuration shown in FIG. 6 are as follows: when IFB2 at the point when the signal used for sending the charging current starting signal to the capacitor 34 is generated is set after the decrease in the feedback current IFB, the ratio of IFB2 to the maximum voltage of VFBO which determines ILIMIT can be determined relatively easily by detecting the output signal VFBO of the feedback signal control circuit 11Y; and the ratio of ILIMIT to IDP2 can be set easily.

Third Embodiment

Figure 7:
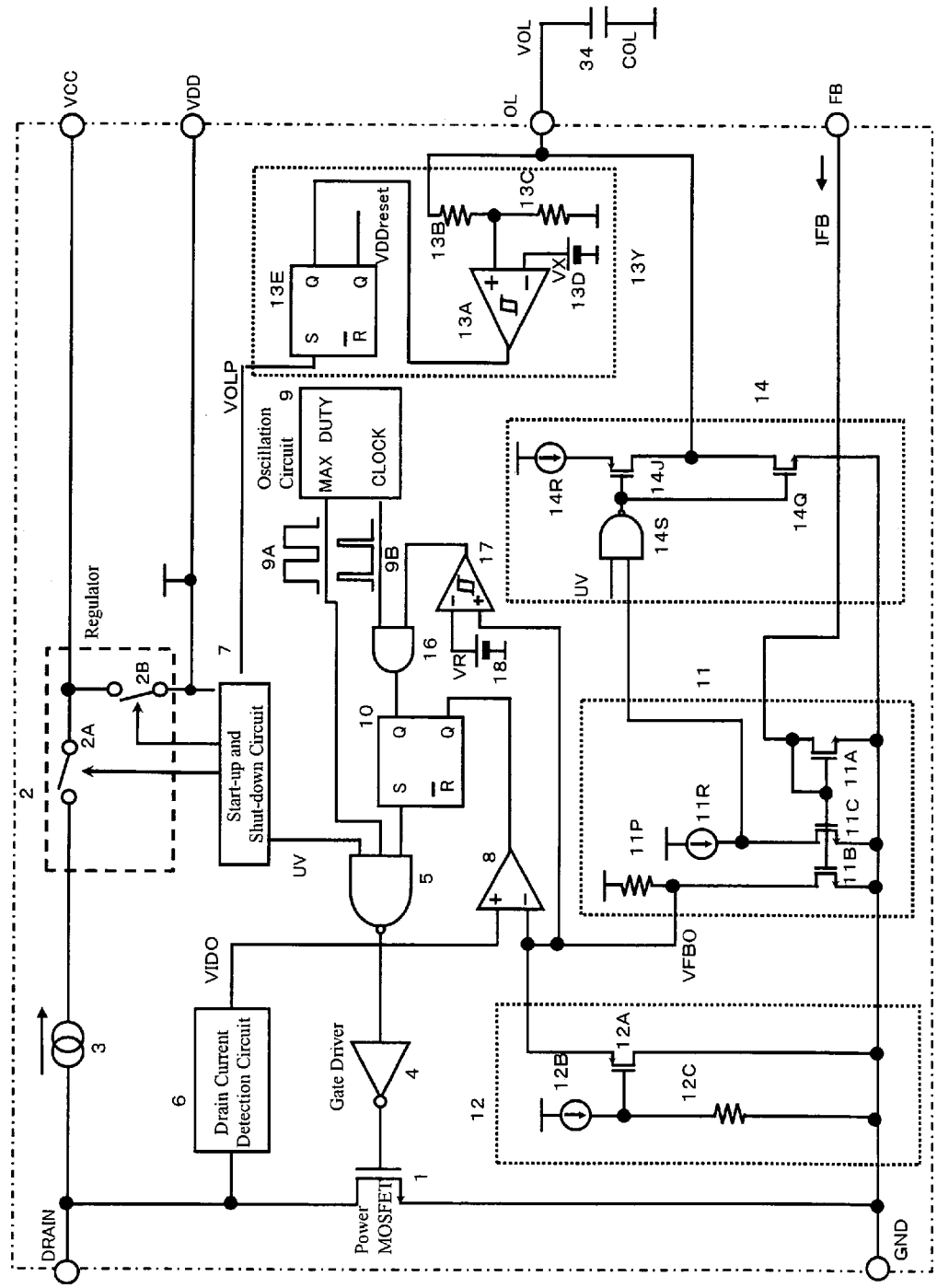
FIG. 7 is a circuit diagram of a semiconductor device included in a switching power supply unit according to a third embodiment of the invention.
Figure 8:
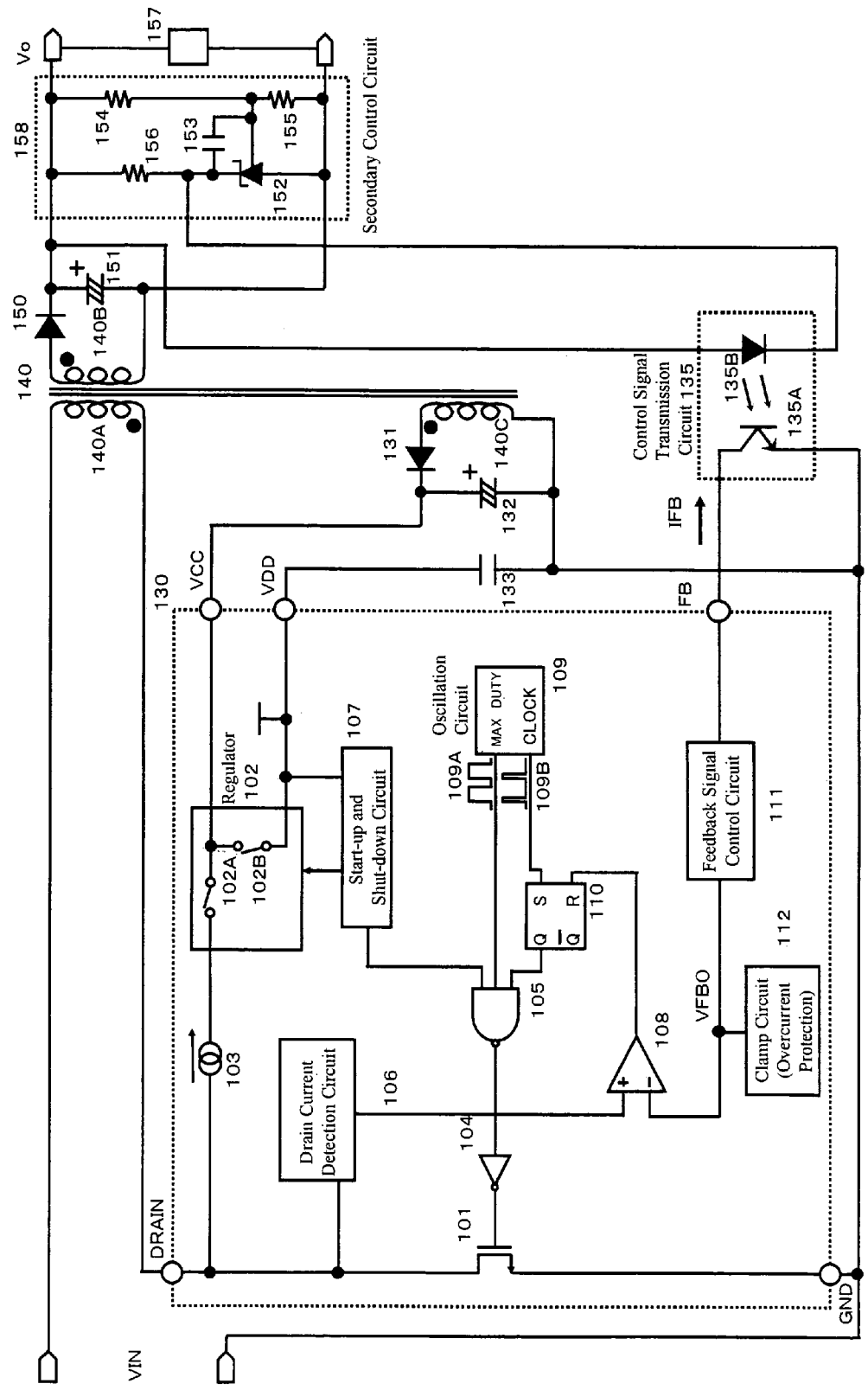
FIG. 8 is a circuit diagram of a conventional switching power supply init.
Figure 9:
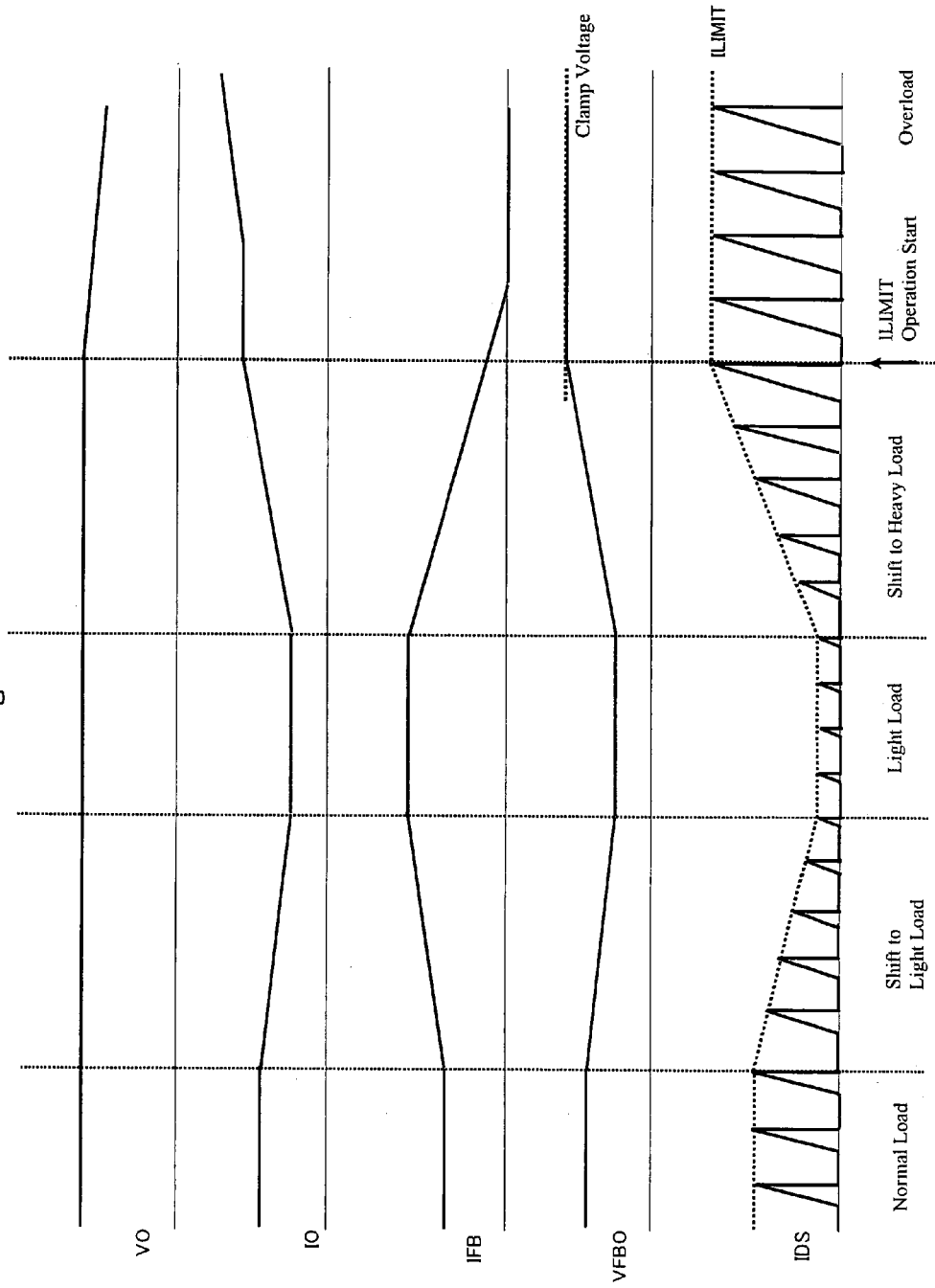
FIG. 9 is a time chart for explaining operations of the conventional switching power supply unit.
Figure 10:
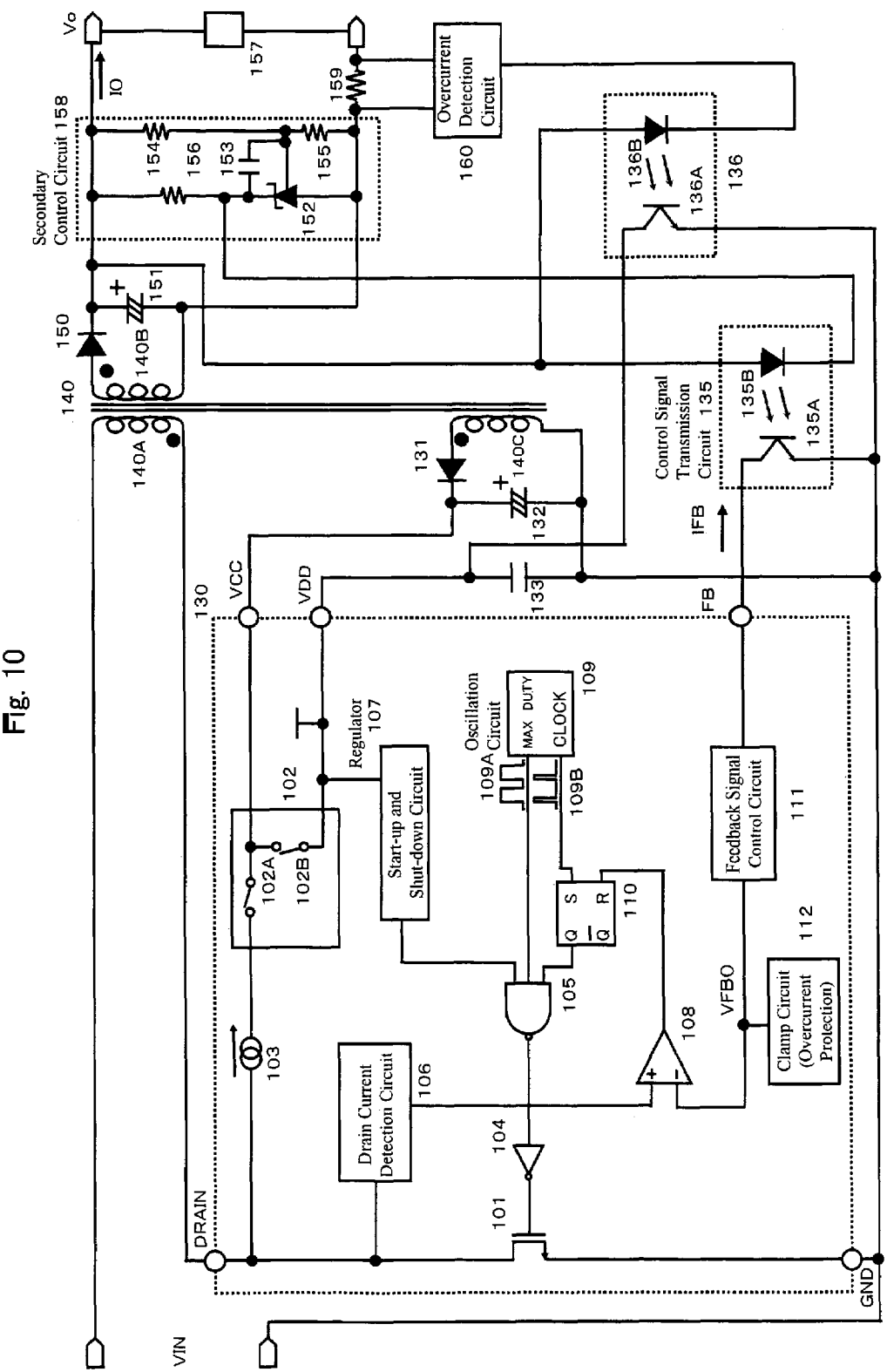
FIG. 10 is a circuit diagram of another conventional switching power supply unit.

FIG. 7 is a circuit diagram of a semiconductor device for controlling a switching power supply included in a switching power supply unit according to a third embodiment of the invention. In FIG. 7, the internal circuit of the semiconductor device 30 shown in FIG. 1 is illustrated in detail, and since reference numerals correspond with those shown in FIG. 1, the explanation of the same component is omitted.

A difference between the configurations shown in FIGS. 7 and 2 is in components in the overload signal output circuit. That is, as shown in FIG. 7, the overload signal output circuit 13Y is provided with a RS flip flop 13E which receives the output signal of the comparator 13A as a set signal. Furthermore, the RS flip flop 13E receives a reset signal VDDreset as an input. VDDreset refers to a reset signal from a component which does output when the input voltage used as power supply decreases, and then the terminal voltage VDD decreases below the specified voltage.

That is, in the third embodiment shown in FIG. 7, when VOL has reached VOLS, and then the switching operation has been stopped by the overload protecting operation, the input voltage used as the power supply decreases, following which the stop of the switching operation continues in a latch mode where the switching operation is stopped until the terminal voltage VDD decreases. Considering the safety of the switching power supply unit, the overload protection in the latch mode, in which the stop of the switching operation is continued so long as the input voltage VIN is input during the overload protecting operation, is realized, and the measure against the peak load can be also taken.

The switching power supply unit and the semiconductor device for the switching power supply unit according to the invention have the effects of concurrently enabling the function of the overload protector operating against the overload continued under the normal load and the continued switching operation while performing the overcurrent protection for a fixed peak-load time period, so that they are useful.

What is claimed is:

1. A switching power supply unit which does output through the conversion of an inputted first direct-current voltage to a second direct-current voltage via a transformer, the switching power supply unit comprising:
a switching device connected to the primary side of the transformer to which the first direct-current voltage is applied;
an output voltage control circuit which stabilizes the second direct-current voltage;
a control signal transmission circuit which transmits a signal from the output voltage control circuit to the primary side of the transformer; and
a control circuit which controls the operation of the switching device,
the control circuit having:
a switching device current detection circuit which detects a current flowing through the switching device and which outputs the current as a device current detection signal;
a feedback signal control circuit which receives the signal from the control signal transmission circuit as a feedback signal, outputs a feedback output signal varying in response to the feedback signal, and outputs a charging start signal for overload protection when the feedback signal has reached a specified feedback signal level;
a comparator which compares the output signal from the switching device current detection circuit and the feedback output signal and which outputs the comparison signal thus produced;
a switching signal control circuit which controls the amount of the current and the output of the switching device based on the comparison signal;
a clamp circuit which fixed the maximum value of the feedback output signal to limit the maximum value of the current of the switching device;
an overload protection delay time control circuit which receives the charging start signal for the overload protection as an input to supply a charging current;
a capacitor for adjusting overload protecting operation delay time which is charged with the charging current of the overload protection delay time control circuit; and
an overload signal output circuit which detects a voltage at the capacitor for adjusting the overload protecting operation delay time and which outputs a switching stop signal when the voltage has exceeded a specified voltage,
the switching signal control circuit controlling the peak value of the current of the switching device according to the feedback signal to the feedback signal control circuit and stopping the operation of the switching device based on the switching stop signal of the overload signal output circuit.

2. The switching power supply unit according to claim 1 further comprising:
an output voltage generation circuit which is connected to the secondary winding of the transformer and which rectifies and smooths the secondary output voltage at the transformer to generate and output the second direct-current voltage whose absolute value is smaller than that of the first direct-current voltage from the first direct-current voltage and
an auxiliary power supply voltage generation circuit which is connected to the auxiliary winding of the transformer, generates a primary output voltage, and rectifies and smooths the generated primary output voltage to generate an auxiliary power supply voltage to be supplied to the control circuit as a power supply voltage.

3. The switching power supply unit according to claim 1, wherein the control signal transmission circuit transmits the signal from the output voltage control circuit to the primary side of the transformer in one system.

4. The switching power supply unit according to claim 1, wherein the feedback signal of the feedback signal control circuit at a time when the feedback output signal starts to be fixed at a maximum value corresponds to a first feedback signal level, a current which is able to flow to the switching device at the first feedback signal level becomes maximum, and when the feedback signal is at a specified feedback signal level, the first feedback signal level and the specified feedback signal level are set in a manner that a current, which is smaller than the maximum current which is able to flow, flows into the switching device.

5. The switching power supply unit according to claim 4, wherein the absolute value of the current of the feedback signal of the feedback signal control circuit at the first feedback signal level is smaller than that of the current of the feedback signal at the specified feedback signal level.

6. The switching power supply unit according to claim 1, wherein the feedback signal control circuit is provided with a constant current source for detecting the specified feedback signal level used for detecting the feedback signal which has reached the specified feedback signal level and outputs the charging start signal for the overload protection through the comparison of the current value of the constant current source for detecting the specified feedback signal level and the current value proportional to the feedback signal.

7. The switching power supply unit according to claim 1, wherein the feedback signal control circuit is provided with a charging start detection comparator for the overload protection which compares the feedback output signal and a charging start detecting reference voltage source for the overload protection specified therein, the charging start detection comparator for the overload protection outputting the charging start signal for the overload protection when the comparator has detected the specified feedback signal level as the feedback output signal.

8. The switching power supply unit according to claim 1, wherein the feedback signal control circuit is provided with a light-load mode detection comparator, which compares the feedback output signal and a light-load reference voltage source specified therein, and performs the current peak control and the intermittent operation of the switching device according to the feedback signal to the feedback signal control circuit.

9. The switching power supply unit according to claim 1, wherein the control circuit is further provided with an oscillator which generates and outputs a switching signal to be applied to the switching device.

10. The switching power supply unit according to claim 1, wherein the overload signal output circuit outputs the switching operation stop signal through the detection of a rise in the voltage at the capacitor for adjusting the overload protection delay time to the first specified voltage and outputs an output signal, which restarts the switching operation of the switching device, through the detection of an decrease in the voltage at the capacitor for adjusting the overload protection delay time below the second specified voltage, and the overload protection delay time control circuit stops the charging to the capacitor for adjusting the overload protecting operation delay time to keep a state in which discharging current is flowed for a fixed time period.

11. The switching power supply unit according to claim 1, wherein the overload signal output circuit outputs the switching operation stop signal in a latch mode through the rise in the voltage at the capacitor for adjusting the overload protection delay time to the specified voltage.

12. A semiconductor device having a control circuit and used for a switching power supply unit which comprises:
a switching device connected to the primary side of a transformer to which a first directcurrent voltage is input;
an output voltage control circuit which stabilizes a second direct-current voltage to become an output of the secondary side of the transformer;
a control signal transmission circuit which transmits a signal from the output voltage control circuit to the primary side of the transformer; and
the control circuit which controls the operation of the switching device,
the control circuit having:
a switching device current detection circuit which detects a current flowing through the switching device to output the current as a device current detection signal;
a feedback signal control circuit which receives the signal from the control signal transmission circuit as a feedback signal, outputs a feedback output signal varying in response to the feedback signal, and outputs a charging start signal for overload protection when the feedback signal has reached a specified feedback signal level;
a comparator which compares the output signal from the switching device current detection circuit and the feedback output signal to output the comparison signal thus produced;
a switching signal control circuit which controls the amount of the current and the output of the switching device based on the comparison signal;
a clamp circuit which fixes the maximum value of the feedback output signal to limit the maximum value of the current of the switching device;
an overload protection delay time control circuit which receives the charging start signal for the overload protection as an input to supply a charging current;
a capacitor for adjusting overload protecting operation delay time which is charged with the charging current of the overload protection delay time control circuit; and
an overload signal output circuit which detects a voltage at the capacitor for adjusting the overload protecting operation delay time and which outputs a switching stop signal when the voltage has exceeded a specified voltage,
the switching signal control circuit controlling the peak value of the current of the switching device according to the feedback signal to the feedback signal control circuit and stopping the operation of the switching device based on the switching stop signal of the overload signal output circuit.

13. The semiconductor device for the switching power supply according to claim 12, wherein the feedback signal of the feedback signal control circuit at a time when the feedback output signal starts to be fixed at a maximum value corresponds to a first feedback signal level, a current which is able to flow into the switching device at the first feedback signal level becomes maximum, and when the feedback signal is at a specified feedback signal level, the first feedback signal level and the specified feedback signal level are set in a manner that a current, which is smaller than the maximum current which is able to flow, flows into the switching device.

14. The semiconductor device for the switching power supply according to claim 13, wherein the absolute value of the current of the feedback signal of the feedback signal control circuit at the first feedback signal level is smaller than that of the current of the feedback signal at the specified feedback signal level.

15. The semiconductor device for the switching power supply according to claim 12, wherein the feedback signal control circuit is provided with a constant current source for detecting the specified feedback signal level used for detecting the feedback signal which has reached the specified feedback signal level and outputs the charging start signal for the overload protection through the comparison of the current value of the constant current source for detecting the specified feedback signal level and the current value proportional to the feedback signal.

16. The semiconductor device for the switching power supply according to claim 12, wherein the feedback signal control circuit is provided with a charging start detection comparator for the overload protection which compares the feedback output signal and a charging start detecting reference voltage source for the overload protection specified therein, the charging start detection comparator for the overload protection outputting the charging start signal for the overload protection when the comparator has detected the specified feedback signal level as the feedback output signal.

17. The semiconductor device for the switching power supply according to claim 12, wherein the feedback signal control circuit is provided with a light-load mode detection comparator, which compares the feedback output signal and a light-load reference voltage source specified therein, and performs the current peak control and the intermittent operation of the switching device according to the feedback signal to the feedback signal control circuit.

18. The semiconductor device for the switching power supply according to claim 12, wherein the control circuit is further provided with an oscillator which generates and outputs a switching signal to be applied to the switching device.

19. The semiconductor device for the switching power supply according to claim 12, wherein the overload signal output circuit outputs the switching operation stop signal through the detection of a rise in the voltage at the capacitor for adjusting the overload protection delay time to the first specified voltage and outputs an output signal, which restarts the switching operation of the switching device, through the detection of an decrease in the voltage at the capacitor for adjusting the overload protection delay time below the second specified voltage, and the overload protection delay time control circuit stops the charging to the capacitor for adjusting the overload protecting operation delay time to keep a state in which discharging current is flowed for a fixed time period.

20. The semiconductor device for the switching power supply according to any one of claims 12 to 18, wherein the overload signal output circuit outputs the switching operation stop signal in a latch mode through the rise in the voltage at the capacitor for adjusting the overload protection delay time to the specified voltage.

21. The semiconductor device for the switching power supply according to claim 12, wherein the switching device and the control circuit are formed on the same semiconductor substrate.

* * * * *